United States Patent
Nguyen

(10) Patent No.: US 7,162,339 B2
(45) Date of Patent: Jan. 9, 2007

(54) AUTOMATED VEHICLE CALIBRATION AND TESTING SYSTEM VIA TELEMATICS

(75) Inventor: Huan T. Nguyen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 175 days.

(21) Appl. No.: 10/930,531

(22) Filed: Aug. 31, 2004

(65) Prior Publication Data

US 2006/0047381 A1 Mar. 2, 2006

(51) Int. Cl.
*G06F 19/00* (2006.01)
(52) U.S. Cl. .................................... 701/33
(58) Field of Classification Search ................ None
See application file for complete search history.

(56) References Cited

U.S. PATENT DOCUMENTS

| | | | |
|---|---|---|---|
| 5,189,617 A * | 2/1993 | Shiraishi | 701/48 |
| 5,442,553 A * | 8/1995 | Parrillo | 455/420 |
| 5,764,919 A * | 6/1998 | Hashimoto | 709/236 |
| 6,732,032 B1 * | 5/2004 | Banet et al. | 701/23 |
| 6,975,612 B1 * | 12/2005 | Razavi et al. | 370/338 |
| 7,003,289 B1 * | 2/2006 | Kolls | 455/422.1 |
| 2004/0167689 A1 * | 8/2004 | Bromley et al. | 401/29 |

* cited by examiner

*Primary Examiner*—Michael J. Zanelli
(74) *Attorney, Agent, or Firm*—Laura C. Hargitt

(57) ABSTRACT

Methods and apparatus are provided for automatically updating the calibration parameters of a vehicle from a remote location. The apparatus typically comprises an onboard computing platform connected to electronic control units in the vehicle. The computing platform is typically pre-programmed with initial vehicle calibration parameters for downloading to the electronic control units. A remote calibration data system is generally configured to acquire vehicle performance data via a wireless communication link, and to update the vehicle calibration parameters based on statistical analysis of the acquired data. The updated calibration parameters are then typically transmitted by the remote calibration data system to the computing platform via the communication link. The computing platform can then download the updated calibration parameters to the electronic control units. The automatic updating process described herein is generally applicable to a population of appropriately equipped vehicles in communication with a centralized remote calibration data system.

21 Claims, 3 Drawing Sheets

AUTOMATED VEHICLE CALIBRATION AND TESTING SYSTEM VIA TELEMATICS

TECHNICAL FIELD

The present invention generally relates to the calibration of automotive vehicles, and more particularly relates to the calibration updating of automotive vehicles by remote control.

BACKGROUND

The operating characteristics of modern automotive vehicles are generally based on computer algorithms that are pre-programmed into various electronic control units that are installed in the vehicles. The algorithms are typically configured to provide operating parameters to the electronic control units, representing a desired standard of vehicle performance. The electronic control units are thereby calibrated with appropriate vehicle parameters to control the operation of various corresponding automotive systems, such as engine, transmission, steering, braking, and the like.

The vehicle calibration parameters are typically obtained by gathering performance data from a pilot group of instrumented test vehicles. Extensive testing of the pilot vehicles is generally performed under varying environmental conditions (hot/cold weather, altitude, highway/city driving, etc.) in order to establish a statistical performance average for the calibration of production vehicles. This statistical performance average is designated herein as a Figure of Merit (FOM), and is typically based on the testing of a relatively small number (e.g., 5 to 100) of pilot vehicles.

Experience has shown, however, that the average performance of a relatively large population (e.g., thousands) of production vehicles may differ from the FOM of the test vehicle sample. This deviation from the original FOM can result from production tolerances, driving wear and tear, and so forth. As such, an optimum FOM for production vehicles can change as the number of on-road vehicles increases. In order to adjust the calibration of a production vehicle for optimal performance, however, the production vehicle would typically require a conventional recalibration process, which can be both costly and time-consuming.

Accordingly, it is desirable to provide a method and apparatus for automatically updating the calibration of a vehicle. In addition, it is desirable to implement the automatic calibration updating with minimal inconvenience to the vehicle operator. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for automatically updating the calibration parameters in a vehicle. One exemplary embodiment comprises a system having a computing platform in a vehicle, with the vehicle calibration parameters stored in the computing platform memory for downloading to various electronic control units (ECU's) within the vehicle. The electronic control units are configured to control corresponding sub-systems within the vehicle in accordance with the received calibration parameters. The computing platform is also configured to monitor vehicle performance data.

The exemplary embodiment further comprises a remote calibration data system and a telematics communication link, such as a cellular network wireless infrastructure, between the computing platform in the vehicle and the remote calibration data system. The remote calibration data system typically includes a data acquisition system and a storage device. The remote calibration data system is generally configured to acquire vehicle performance data from the computing platform in the vehicle via the telematics communication link. The remote calibration data system can then generate updated vehicle calibration parameters based on an analysis of the acquired vehicle performance data, and can remotely update the vehicle calibration parameters in the vehicle computing platform via the telematics communication link.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of calibrating the operating systems of automotive vehicles. Typically, a production vehicle is calibrated in accordance with an average Figure of Merit (FOM) that is based on data derived from a limited number of test vehicles. This initial FOM may not be as optimal for a large population of production vehicles as for the smaller number of test vehicles. Therefore, an exemplary system is described herein that enables the calibration of production vehicles to be automatically updated in accordance with actual production vehicle performance data.

Figure 1:
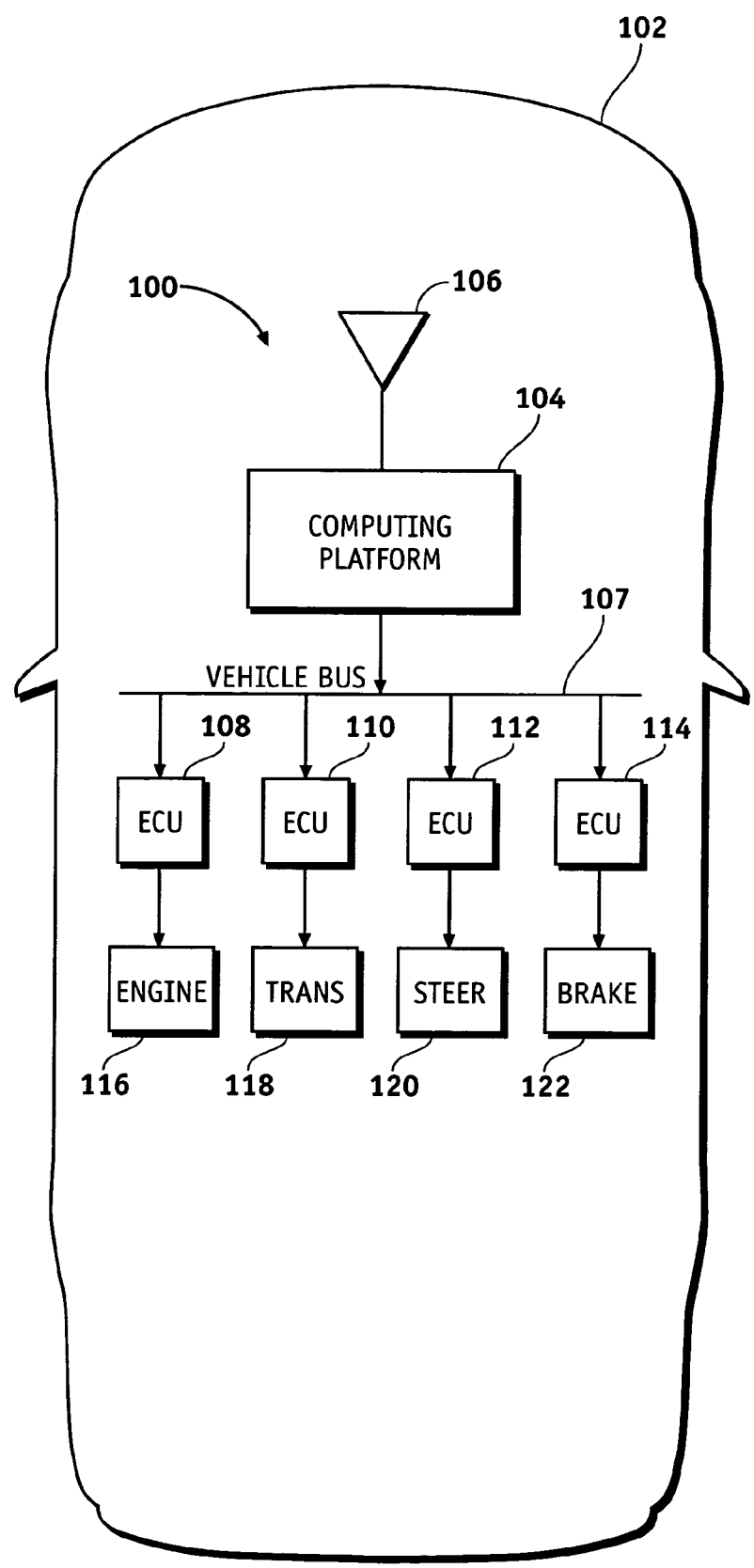
FIG. 1 is a block diagram of an exemplary onboard vehicle control system.

According to an exemplary embodiment of a vehicle control system 100, as illustrated in the block diagram of FIG. 1, a vehicle 102 contains an onboard computing platform 104. Typically, computing platform 104 is connected to a wireless communication device 106, such as a cellular phone coupling to an antenna. Computing platform 104 is typically coupled via a vehicle bus 107 to various electronic control units (ECU's) 108, 110, 112, 114. The ECU's are generally configured to control various corresponding automotive sub-systems. In the FIG. 1 example, ECU 108 controls an engine sub-system 116, ECU 110 controls a transmission sub-system 118, ECU 112 controls a steering sub-system 120, and ECU 114 controls a braking sub-system 122. The configuration of FIG. 1 is merely exemplary, however, and may be similarly represented by many other combinations of ECU's and corresponding sub-systems.

ECU's 108, 110, 112, 114 are typically pre-programmed with calibration algorithms and parameters for directing the functions of their respective sub-systems 116, 118, 120, 122.

For example, ECU 108 will typically be pre-programmed with the software algorithm and calibration data for the timing of fuel injectors in engine sub-system 116. In another example, software algorithms and calibration data are typically pre-programmed into ECU 110 to control transmission sub-system 118. In similar fashion, ECU 112 and ECU 114, as well as others, are typically pre-programmed to control steering sub-system 120 and braking sub-system 122, respectively. The various software algorithms and calibration data are typically generated during vehicle development, and are normally programmed into the vehicle during the manufacturing process. In this exemplary embodiment, updated calibrations can be supplied to computing platform 104 from a remote source, and can then be reprogrammed into the ECU's via vehicle bus 107. As stated previously, the block diagram of FIG. 1 is merely one exemplary embodiment of many possible onboard vehicle control configurations.

Figure 2:
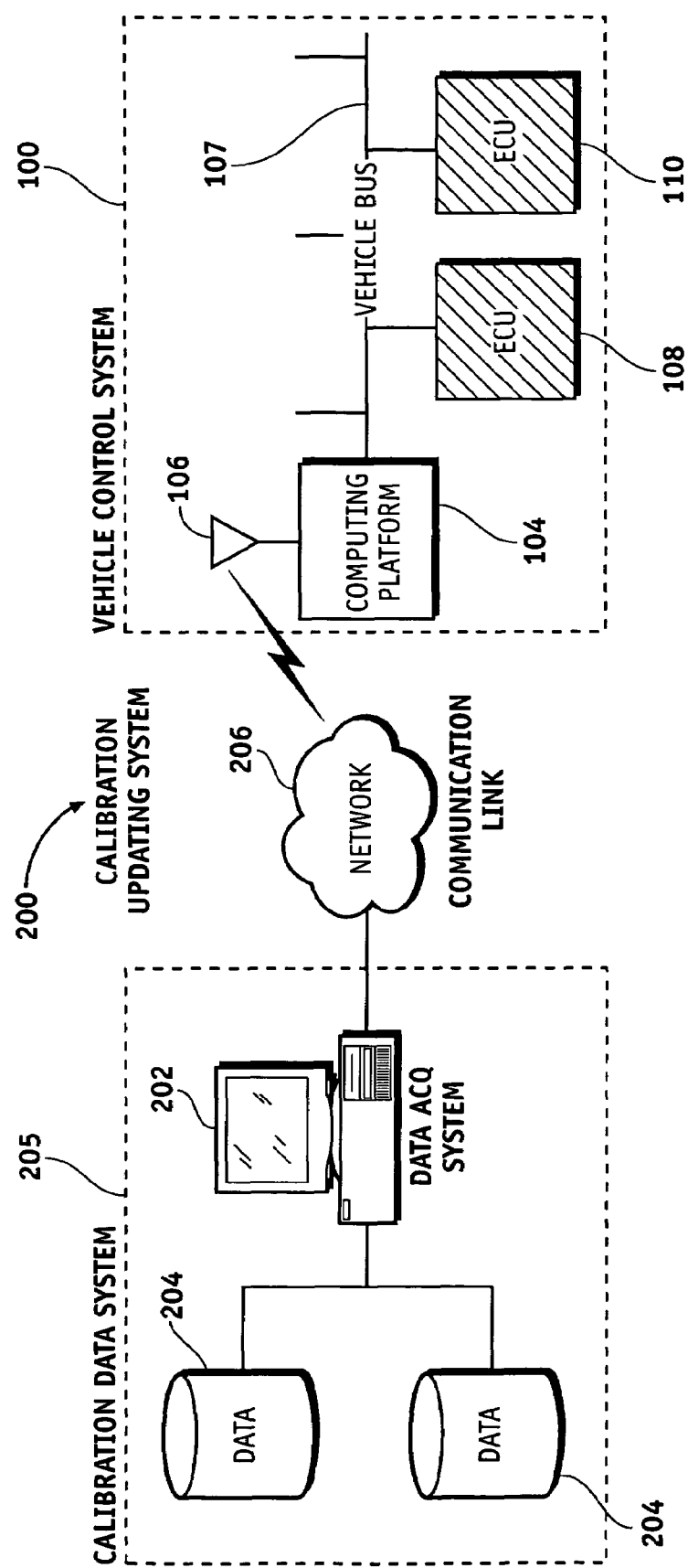
FIG. 2 is a block diagram of an exemplary calibration and control system for a vehicle.

An exemplary embodiment of a calibration updating system 200 is shown in block diagram form in FIG. 2. In this embodiment, a remote data acquisition system 202 is typically coupled to one or more data storage devices 204 to form a calibration data system 205. Data storage devices 204 may be internal or external to data acquisition system 202, and may be any appropriate type of digital storage device, such as RAM, EEPROM, flash memory, or the like. Data acquisition system 202 is also typically coupled to a communication link 206, such as a cellular network wireless infrastructure (CDMA, packet data, etc.,) or short-range wireless (802.11, BlueTooth, etc.), for example.

Data acquisition system 202 is typically configured with a computing platform and associated data acquisition and analysis software. The computing platform is typically a processor, such as a microprocessor, microcontroller, or other computing device capable of executing instructions in any suitable computing language. The data acquisition and analysis software enables data acquisition system 202 to acquire and analyze performance data from a population of production vehicles equipped with onboard control systems, such as the exemplary system 100 of FIG. 1, which is shown in abbreviated form in FIG. 2. Each appropriately equipped production vehicle is typically configured to communicate performance data from its onboard computing platform 104 and wireless device 106 to data acquisition system 202 via communication link 206. As such, data acquisition system 202 can receive ongoing performance data from a large population of production vehicles operating in varying environments and driving conditions.

Computing platform 104 is typically a microprocessor-based system with various forms of memory such as RAM, EEPROM, compact flash, USB flash card, etc. for storing calibration data. Computing platform 104 is generally capable of executing native software applications, and is also generally capable of supporting a framework such as the Open Services Gateway Initiative (OSGI). This type of framework can be useful for downloading and executing applications that are written in a language such as Java. Such application software can generally be deployed in real time to computing platform 104 or may be resident in computing platform 104. These software applications will typically be triggered by an event such as engine start-up, or the applications might be triggered by other internal and/or external events, or by other scenarios designated by a calibration engineer.

The performance data generated by computing platform 104 is typically derived from sensors (not shown) associated with the vehicle ECU's or with their corresponding automotive sub-systems. For example, engine air-fuel ratio, vehicle speed, fuel injector temperature, etc., may represent typical vehicle performance parameters that can be transmitted by computing platform 104 and antenna device 106 via communication link 206 to data acquisition system 202.

In addition, other types of vehicle operational information can also be monitored and transmitted to data acquisition system 202. For example, driver-generated data (verbal or otherwise), as well as digitized video and audio from in-vehicle cameras can be processed through computing platform 104 and transmitted via telematics 206 to data acquisition system 202.

The performance data and operational information collected by data acquisition system 202 can be stored in storage devices 204 until a predetermined aggregate sample quantity is accumulated, or until another predetermined criterion is met, such as a time period. The accumulated data can then be analyzed by data acquisition system 202 to generate updated FOM calibration data that is typically based on a statistical average of the acquired performance data. An operator (e.g., a calibration engineer) can control this calibration updating process through the use of various testing methods, such as data logging/viewing, slewing, calibration analysis and bus monitoring. The operator can also utilize remote instrumentation (not shown) for such tasks as debugging software, determining root causes of problems, and developing new calibrations.

Figure 3:
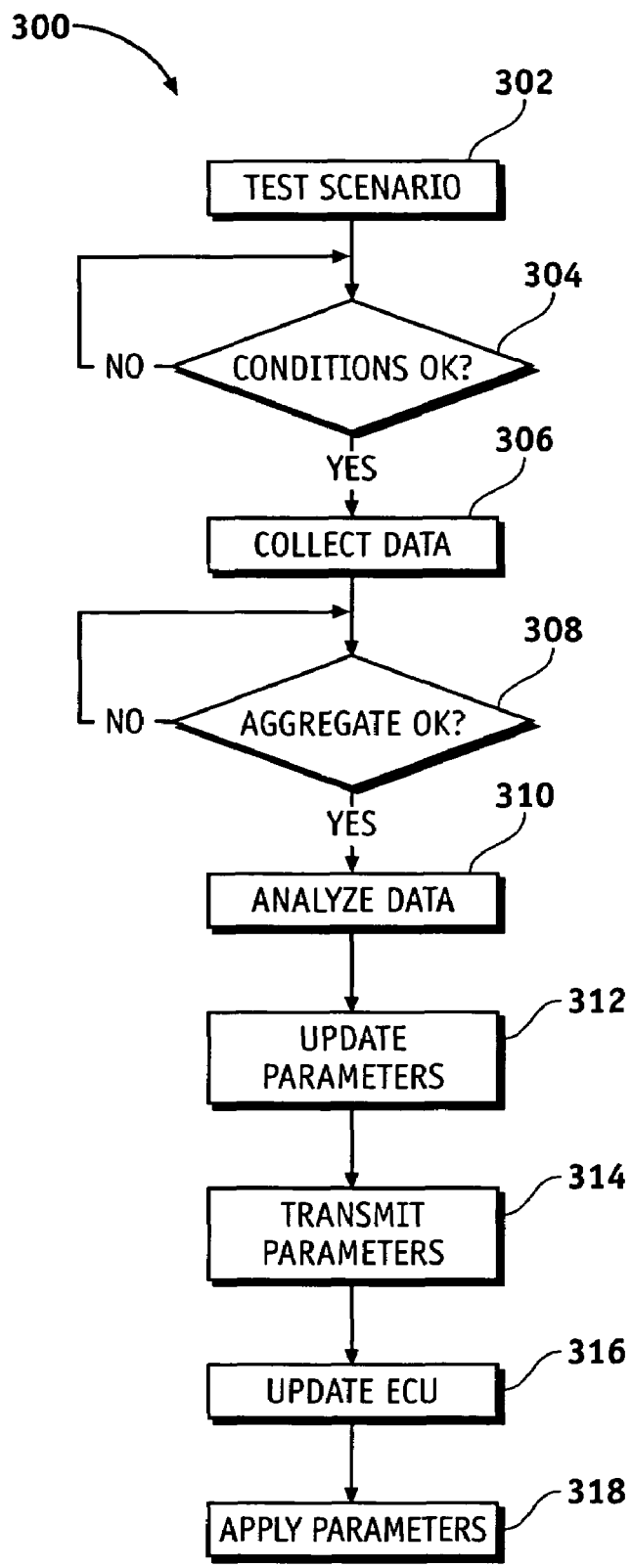
FIG. 3 is an exemplary flow diagram of a calibration parameter updating process.

For example, as illustrated in the flow diagram 300 of FIG. 3, an operator may choose a particular test scenario (step 302), such as acquiring oxygen sensor data from a vehicle only after the vehicle engine is in a closed-loop condition. Or, in another scenario, an operator could specify that the oxygen sensor data be acquired only after the vehicle is in motion for more than a certain amount of time, e.g., 10 minutes. Once the scenario is established in step 302, the operator can ascertain if the test conditions have been met (step 304). If so ("yes" in step 304), the oxygen sensor data can be collected by data acquisition system 202 from computing platform 104 (step 306) until a sufficient quantity of data has been aggregated for a statistical analysis (step 308). Data acquisition system 202 can then be used to analyze the aggregated oxygen sensor data (step 310) with data collected from similar vehicle configurations, and to generate updated calibration parameters (step 312) for the relevant oxygen control sub-system, such as engine sub-system 116, in vehicle 102.

The updated calibration parameters are typically transmitted from data acquisition system 202 via communication link 206 and wireless communication device 106 to computing platform 104 in vehicle 102 (step 314). Computing platform 104 can then reprogram the appropriate ECU, such as ECU 108 for engine sub-system 116, with the updated calibration parameters received from data acquisition system 202 (step 316). Finally, in step 318, ECU 108 can apply the updated calibration parameters to engine sub-system 116. In this manner, a calibration engineer, for example, can remotely enhance the driving performance and reliability of a population of vehicles by periodically updating the calibration parameters of the various vehicle sub-systems.

In another exemplary embodiment, the calibration updating process can be automated by using appropriate algorithms within data acquisition system 202 and, typically, with corresponding algorithms in computing platform 104. The updated calibration data can be transferred from acquisition data system 202, via communication link 206, wireless device 106 and computing platform 104 in vehicle 102 in accordance with any appropriate automatic updating scheme. Computing platform 104 can then download the respective updated calibrations to the associated ECU's. The ECU's can then implement the updated calibrations to improve the performance of their corresponding sub-systems.

The calibration parameter updating process described herein for a vehicle can also apply to a population of vehicles that are appropriately equipped with computing platforms configured to communicate with a remote calibration data system. In general, a larger population of monitored vehicles will enable a more optimal calibration parameter updating process, since the updating analysis will typically be based on a more statistically valid data sample.

Accordingly, the shortcomings of the prior art have been overcome by providing an improved vehicle calibration system. The exemplary embodiment described herein enables the initial factory calibrations, which are typically based on a relatively small sample of pilot test vehicles, to be updated periodically, based on actual performance data acquired from a population of production vehicles. This ongoing performance data is typically generated by onboard computing platforms that are configured to monitor their respective vehicle performance parameters, and to transmit the resultant data via a wireless infrastructure to a centralized remote calibration data system. The calibration data system can then accumulate aggregate samples of multi-vehicle performance data in order to generate updated Figure Of Merit (FOM) parameter calibrations. At appropriate intervals, the updated FOM calibrations can be transmitted to the computing platforms in the various production vehicles. The updated FOM calibrations can then be downloaded from the computing platforms to their respective ECU's and corresponding automotive sub-systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for automatically updating the calibration parameters in a vehicle, comprising:
    a computing platform within the vehicle, the computing platform configured to monitor vehicle performance data and to upload and download the calibration parameters;
    a remote calibration data system; and
    a telematics communication link between the computing platform and the remote calibration data system;
    wherein the remote calibration data system is configured to acquire vehicle operational and performance data from the computing platform via the telematics communication link, and wherein the remote calibration data system is further configured to generate updated vehicle calibration parameters based on an analysis of the acquired vehicle performance data, and wherein the remote calibration data system is further configured to transmit the updated vehicle calibration parameters to the computing platform via the telematics communication link,
    wherein the vehicle performance data is generated from sensors within the vehicle, and wherein the sensors detect at least one of visual activity within the vehicle and audible activity within the vehicle.

2. The system of claim 1 further comprising at least one electronic control unit within the vehicle, the at least one electronic control unit configured to receive the calibration parameters from the computing platform, and the at least one electronic control unit further configured to control a corresponding sub-system in the vehicle in accordance with the received calibration parameters.

3. The system of claim 1 wherein the remote calibration data system comprises a data acquisition system and a storage device.

4. The system of claim 1 wherein the telematics communication link is a wireless infrastructure.

5. The system of claim 1 wherein the sensors detect mechanical performance characteristics of the vehicle.

6. The system of claim 1 wherein the sensors detect electrical performance characteristics of the vehicle.

7. The system of claim 1 wherein the sensors detect visual activity within the vehicle.

8. The system of claim 1 wherein the sensors detect audible activity within the vehicle.

9. The system of claim 1 wherein the remote calibration data system automatically updates the vehicle calibration parameters in the computing platform on a predetermined basis.

10. The system of claim 9 wherein the predetermined basis is a time period.

11. The system of claim 9 wherein the predetermined basis is an aggregate sample of acquired vehicle performance data.

12. The system of claim 1 wherein the remote calibration data system is configured to acquire multi-vehicle performance data via the telematics communication link from a plurality of vehicles having computing platforms, and wherein the remote calibration data system is further configured to generate updated vehicle calibration parameters based on an analysis of the acquired multi-vehicle performance data, and wherein the remote calibration data system is further configured to remotely update the vehicle calibration parameters via the telematics communication link in the plurality of vehicles having computing platforms.

13. A vehicle control system for updating the calibration parameters in a vehicle, comprising:
    a computing platform within the vehicle, the computing platform configured to monitor vehicle performance data and to upload and download the calibration parameters; and
    at least one electronic control unit within the vehicle, the at least one electronic control unit configured to receive the calibration parameters from the computing platform, and the at least one electronic control unit further configured to control a corresponding sub-system in the vehicle in accordance with the received calibration parameters;
    wherein the vehicle performance data is provided by sensors within the vehicle, wherein the sensors detect at least one of visual activity within the vehicle and audible activity within the vehicle,
    wherein the computing platform is configured to transmit the monitored vehicle performance data to a remote source via a telematics communication link and to receive updated calibration parameters automatically from the remote source via the telematics communication link, and wherein the computing platform is further configured to automatically update the calibration parameters in the at least one electronic control unit in accordance with the updated received calibration parameters from the remote source.

14. The vehicle control system of claim 13 wherein the computing platform is a microprocessor-based system having a memory for storing the calibration parameters.

15. The vehicle control system of claim 14 wherein the computing platform is configured to execute resident application programs.

16. The vehicle control system of claim 14 wherein the computing platform is configured to execute application programs downloaded from an external source.

17. A calibration data system for analyzing and updating vehicle calibration parameters, comprising:
a data acquisition system; and
a memory associated with the data acquisition system;
wherein the data acquisition system is configured to acquire operational and performance data from one or more vehicles via a telematics communication link and to store the acquired data in the memory of the data acquisition system, and wherein the data acquisition system is further configured to generate updated vehicle calibration parameters based on an analysis of the stored vehicle operational and performance data, and wherein the data acquisition system is further configured to transmit the updated vehicle calibration parameters to the one or more vehicles via the telematics communication link,
wherein the operational and vehicle performance data is generated from sensors within the vehicle, and wherein the sensors detect at least one of visual activity within the vehicle and audible activity within the vehicle.

18. A method of automatically updating the calibration parameters of a vehicle, comprising the steps of:
selecting a calibration parameter for updating;
remotely acquiring vehicle performance data related to the selected calibration parameter from sensors detecting at least one of visual activity within the vehicle and audible activity within the vehicle;
analyzing the acquired vehicle performance data to generate an updated calibration parameter; and
remotely communicating the updated calibration parameter to the vehicle.

19. The method of claim 18 wherein the analyzing step is based on a statistical average of the acquired vehicle performance data.

20. The method of claim 18 wherein the vehicle performance data is remotely acquired from a plurality of vehicles.

21. The method of claim 18 wherein the updated calibration parameter is remotely communicated to a plurality of vehicles.

* * * * *